UNITED STATES PATENT OFFICE.

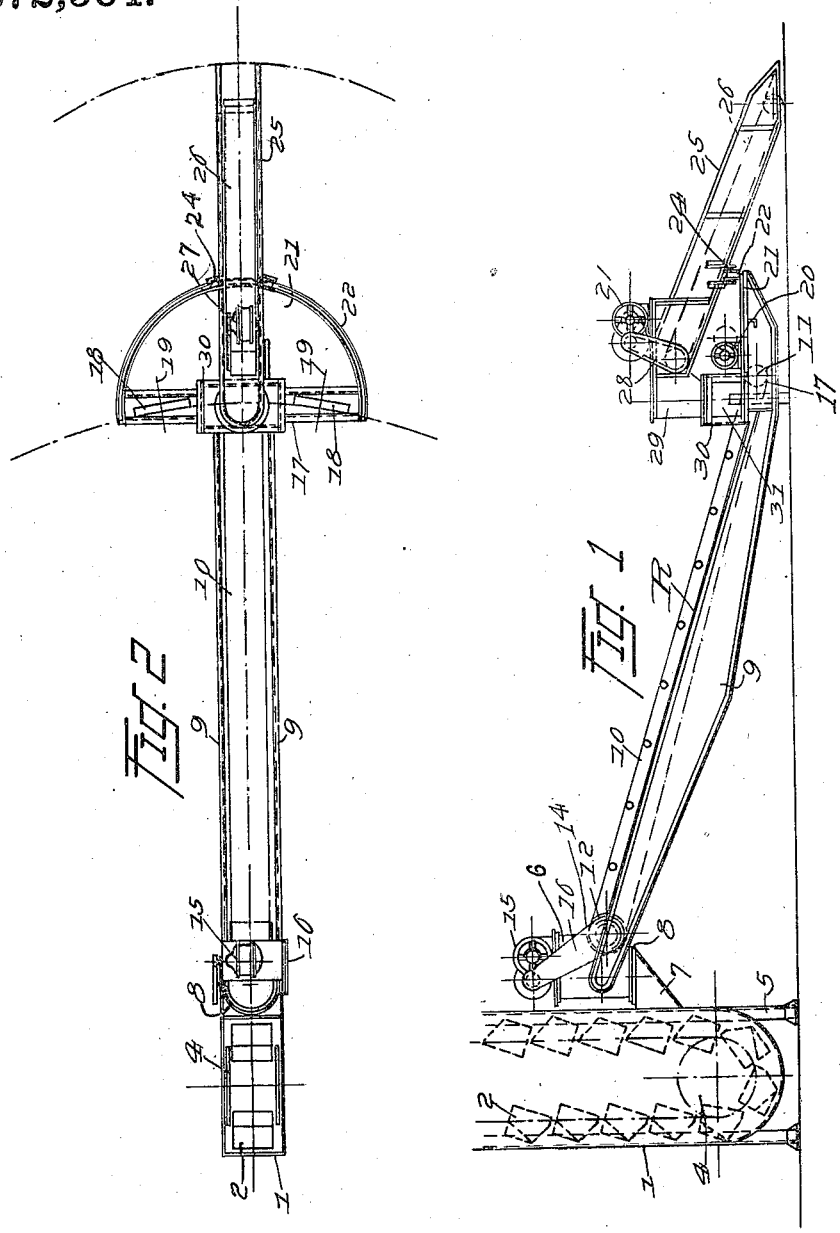

FRANCIS LEE STUART, OF WASHINGTON, DISTRICT OF COLUMBIA, ASSIGNOR TO INTERNATIONAL CONVEYOR CORPORATION, OF NEW YORK, N. Y.

RECLAIMING AND ELEVATING APPARATUS.

1,272,564.  Specification of Letters Patent.  Patented July 16, 1918.

Original application filed November 13, 1917, Serial No. 201,798. Divided and this application filed March 4, 1918. Serial No. 220,303.

*To all whom it may concern:*

Be it known that I, FRANCIS LEE STUART, a citizen of the United States, and a resident of the city of Washington, in the District of Columbia, have invented certain new and useful Improvements in a Reclaiming and Elevating Apparatus, of which the following is a specification.

This invention relates to an apparatus adapted to reach, reclaim and elevate material from piles, holds of vessel and the like.

The object of the present invention is to provide an apparatus of this type comprising an elevating device having digging and reclaiming conveyers coöperating therewith.

This application is a division of my copending application Serial No. 201,798, filed Nov. 13, 1917, and the claims herein are confined to the novel features embodied in the combination of an elevating and reclaiming apparatus.

My improvements are illustrated in the accompanying drawings, in which—

Figure 1 is a side view of a portion of an elevating conveyer having the improved reclaiming apparatus secured thereto.

Fig. 2 is a plan view of the construction illustrated in Fig. 1.

It is frequently desirable to reclaim material in bulk form, such as coal, ore, sand and the like disposed on one level, and deliver the same to an elevating conveyer capable of lifting the same to a higher level where it may be transferred to loading or unloading devices at will. It is the purpose of the present invention to provide an apparatus which may successfully operate in this manner.

Referring more particularly to the drawings, I have illustrated the lower end of the leg or casing 1 within which travels a suitable form of elevating conveyer 2. The conveyer is herein shown as comprising an endless bucket carrier passing around a guide wheel 4 in the lower end of the casing. Supports 5 may be provided for supporting the elevating conveyer and associated parts in any of the positions to which it may be moved.

Disposed on one side of the casing 1 is a hopper 6 delivering directly to the conveyer through the outlet 7. The hopper 6 is mounted on a turn-table 8, illustrated diagrammatically in the drawings, so that the same may have a turning or swinging movement relatively to the casing. The hopper 6 is supplied with material by the reclaiming device R, herein illustrated as comprising a trussed frame 9, the opposite sides of which straddle the hopper. Extending longitudinally of the frame 9 is a conveyer 10, preferably of the endless belt type, which is adapted to pass around a lower guide wheel 11 and an upper discharging or tripper roll 12 extending through the open side 14 of the hopper 6 so as to discharge the material from the conveyer 10 directly into the hopper. In operation the conveyer may be driven by a motor 15 mounted on top of the hopper and transmitting power to drive the conveyer through the mechanism 16.

The lower end of the frame 9 is supported for swinging movement on a truck 17 in which are journaled supporting wheels 18. As indicated diagrammatically in the drawings, the axes 19 of the wheels are at an angle to the direction of travel of the conveyer so as to facilitate swinging movement of the frame 9 when propelled by the motor 20.

The truck 17 is provided with a semi-circular platform 21 around the outer edge of which extends a track 22 on which travels the flanged wheel 24 supporting a digger-frame 25 of any desired construction. The digger-frame carries a conveyer 26 adapted to be crowded into the material to be reclaimed so as to lift the same, when driven by the motor 27 and gearing 28, and deliver the load into the hopper 29. The hopper 29 is mounted on the frame-work 30 carried by the central portion of the truck 17, and has an outlet 31 delivering directly to the conveyer 10. In order to provide a compact construction, the top of the hopper preferably constitutes a platform for supporting the motor 27, and the material is delivered into the hopper through the side thereof as before described in connection with the hopper 6.

It will be obvious that I have provided a reclaiming apparatus which may be bodily moved to the desired operative position, which may be the hold of a vessel or the like. By reason of the independent adjustment which may be given to the digger 25 in addition to the swinging movement which may be imparted to the conveyer 10, different portions of the hold of the vessel or the storage pile may be expeditiously reached and the material reclaimed therefrom.

Since changes may be made in the specific construction of the apparatus herein disclosed I have illustrated the same diagrammatically for the sake of clearness.

I claim as my invention:

1. An apparatus for reclaiming stored material, comprising a vertically arranged elevating conveyer, a hopper through which material is supplied to said conveyer, a boom conveyer mounted at one end to swing about a vertical axis, and which delivers to said hopper, means on the outer end of said boom conveyer for supporting it and for swinging it about said vertical axis, a digger, means for pivotally supporting said digger on the outer end of the boom conveyer to swing about a vertical axis thereon.

2. An apparatus for reclaiming stored material, comprising a vertically arranged elevating conveyer, a hopper through which material is supplied to said conveyer, a turn-table on which said hopper is supported, a boom conveyer supported at its inner end by said turn-table swinging therewith about a vertical axis and which delivers to said hopper, a hopper supported adjacent the outer end of the boom conveyer and mounted to move about a vertical axis passing through the outer end of said boom conveyer, and a digger delivering to said hopper and mounted to turn therewith.

In testimony whereof, I have hereunto subscribed my name.

FRANCIS LEE STUART.